(12) United States Patent
Habusha et al.

(10) Patent No.: US 8,924,652 B2
(45) Date of Patent: Dec. 30, 2014

(54) SIMULTANEOUS EVICTION AND CLEANING OPERATIONS IN A CACHE

(75) Inventors: Adi Habusha, Moshar Alonee-Abba (IL); Eitan Joshua, Ramot Menashe (IL); Shaul Chapman, Alone Aba (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 249 days.

(21) Appl. No.: 13/439,366

(22) Filed: Apr. 4, 2012

(65) Prior Publication Data

US 2012/0260041 A1  Oct. 11, 2012

Related U.S. Application Data

(60) Provisional application No. 61/472,587, filed on Apr. 6, 2011.

(51) Int. Cl.
*G06F 12/08* (2006.01)

(52) U.S. Cl.
CPC ........ *G06F 12/0804* (2013.01); *G06F 12/0864* (2013.01)
USPC ........... 711/143; 711/135; 711/142; 711/122; 711/130; 711/125; 711/144

(58) Field of Classification Search
CPC .................... G06F 12/0804; G06F 12/0864
USPC .......... 711/135, 142, 143, 122, 125, 130, 144
See application file for complete search history.

(56) References Cited

U.S. PATENT DOCUMENTS 7,000,081 B2 * 2/2006 Hooker .......................... 711/143
2011/0153952 A1 * 6/2011 Dixon et al. .................. 711/135

* cited by examiner

*Primary Examiner* — Reginald Bragdon
*Assistant Examiner* — Mehdi Namazi

(57) ABSTRACT

Embodiments provide a method comprising receiving, at a cache associated with a central processing unit that is disposed on an integrated circuit, a request to perform a cache operation on the cache; in response to receiving and processing the request, determining that first data cached in a first cache line of the cache is to be written to a memory that is coupled to the integrated circuit; identifying a second cache line in the cache, the second cache line being complimentary to the first cache line; transmitting a single memory instruction from the cache to the memory to write to the memory (i) the first data from the first cache line and (ii) second data from the second cache line; and invalidating the first data in the first cache line, without invalidating the second data in the second cache line.

20 Claims, 3 Drawing Sheets

SIMULTANEOUS EVICTION AND CLEANING OPERATIONS IN A CACHE

CROSS-REFERENCES TO RELATED APPLICATIONS

The present disclosure claims priority to U.S. Provisional Patent Application No. 61/472,587 filed Apr. 6, 2011, the entire disclosure of which is hereby incorporated by reference in its entirety except for those sections, if any, that are inconsistent with this disclosure. The present disclosure is related to U.S. patent application Ser. No. 12/624,242 filed Nov. 23, 2009, to U.S. patent application Ser. No. 13/038,279 filed Mar. 1, 2011, to U.S. patent application Ser. No. 13/038,258 filed Mar. 1, 2011, and to U.S. patent application Ser. No. 13/071,229 filed Mar. 24, 2011, the entire disclosures of which are hereby incorporated by reference in their entirety except for those sections, if any, that are inconsistent with this disclosure.

TECHNICAL FIELD

Embodiments of the present disclosure relate to the field of cache systems, and more particularly, to eviction and cleaning operations in cache systems.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of riling, are neither expressly nor impliedly admitted as prior art against the present disclosure.

With advancement in memory technology, native burst length of memories is also increasing. In an example, a cache is coupled to a memory. If a length of the cache lines of the cache (i.e., a native burst length of the cache) is less compared to a native burst length of the memory (e.g., if the native burst length of the cache is 32 bytes, and the native burst length of the memory is 64 bytes), it may result in a sub-optimal accessing of the memory by the cache.

SUMMARY

In various embodiments, there is provided a method comprising receiving, at a cache associated with a central processing unit that is disposed on an integrated circuit, a request to perform a cache operation on the cache; in response to receiving and processing the request, determining that first data cached in a first cache line of the cache is to be written to a memory that is coupled to the integrated circuit; identifying a second cache line in the cache, the second cache line being complimentary to the first cache line; transmitting a single memory instruction from the cache to the memory to write to the memory (i) the first data from the first cache line and (ii) second data from the second cache line; and invalidating the first data in the first cache line, without invalidating the second data in the second cache line.

The present disclosure also provides a system comprising a memory; and an integrated circuit coupled to the memory, the integrated circuit comprising: a plurality of central processing units, and a cache configured to receive, from one of the plurality of central processing units, a request to perform a cache operation on the cache; in response to receiving the request, select a first cache line for eviction, where the first cache line caches first data; identify a second cache line in the cache, the second cache line being complimentary to the first cache line; transmit a single memory instruction from the cache to the memory to write to the memory (i) the first data from the first cache line and (ii) second data from the second cache line; and invalidate the first data in the first cache line, without invalidating the second data in the second cache line.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION

Figure 1:
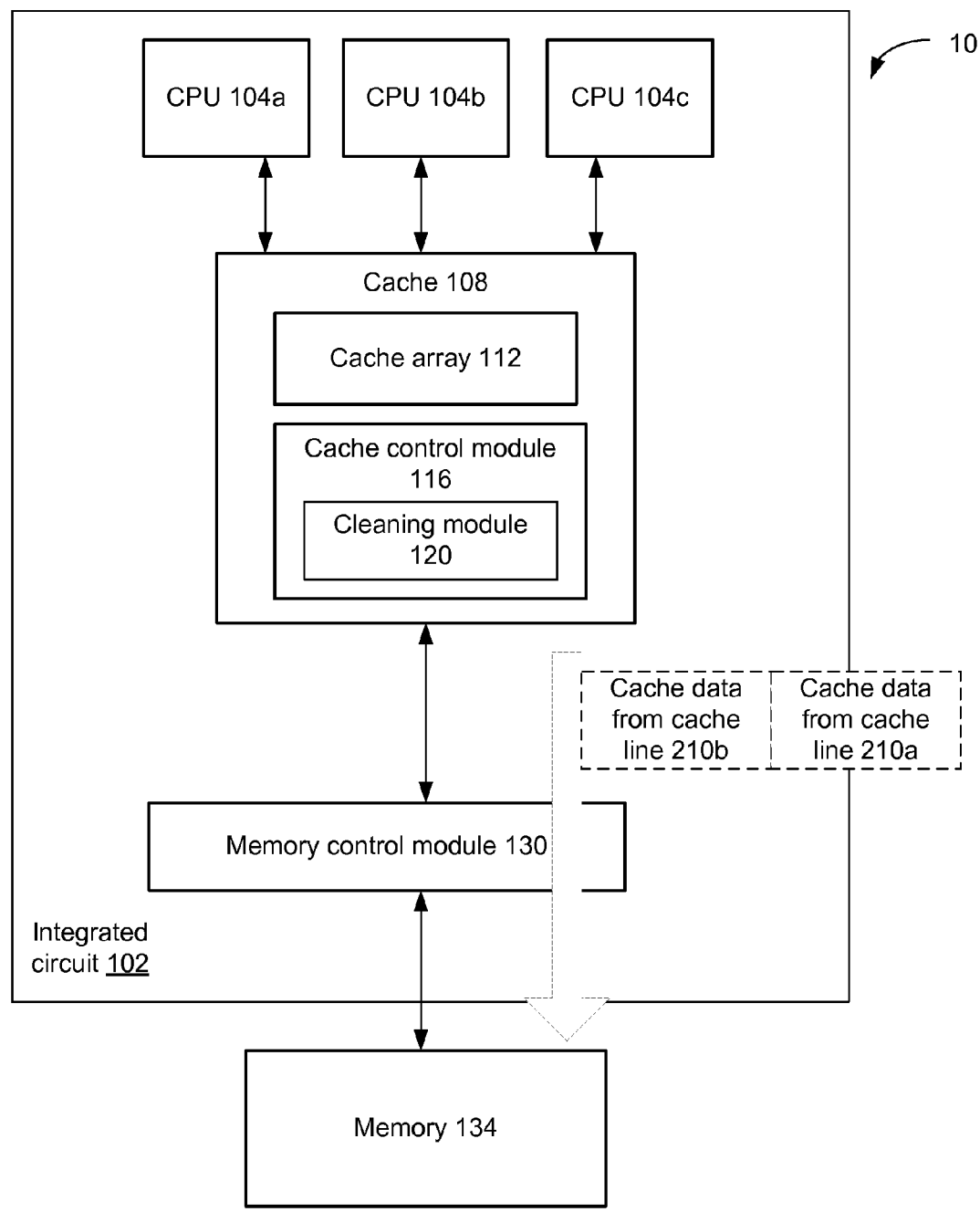
FIG. 1 schematically illustrates an example of a computing system, in accordance with an embodiment.

FIG. 1 schematically illustrates an example of a computing system 10 (also referred to herein as "system 10"), in accordance with an embodiment. The system 10 includes an integrated circuit 102 coupled to a memory 134.

The integrated circuit 102 comprises a plurality of central processing units CPU 104a, 104b and 104c operatively coupled to a cache 108. The cache 108 is coupled to the memory 134 via a memory control module 130 included in the integrated circuit 102. In an embodiment, the integrated circuit 102 is a system on a chip (SOC).

As will be discussed in more detail herein, in an embodiment, the cache 108 receives, from one of the CPUs 104a, . . . , 104c, a request to perform a cache operation. Based on receiving and processing the request to perform the cache operation, the cache 108 determines that first data cached in a first cache line of a cache array 112 of the cache 108 is to be evicted to the memory 134 (e.g., by writing the first data cached in the first cache line to the memory 134, then invalidating the first data cached in the first cache line, and possibly replacing the first data cached in the first cache line by new data). The cache 108 also identifies a second cache line of the cache array 112, where the second cache line is complimentary to the first cache line (e.g., is adjacent to the first cache line) and where the second cache line caches second data. The cache 108 transmits a single memory instruction to the memory 134 to write to the memory 134 (i) the first data from the first cache line and (ii) the second data from the second cache line. As an example, the first cache line is 210b and the second cache line is 210a (these cache lines are discussed in more detail in FIG. 2), and the cache 108 transmits a single memory instruction (e.g., illustrated as a dotted arrow in FIG. 1) to the memory 134 (e.g., via the memory control module 130) to write to the memory 134 the first cache data from the first cache line 210b and the second cache data from the second cache line. Subsequent to transmitting the single memory instruction to the memory 134, the first data is invalidated in the first cache line (and possibly subsequently replaced with new data), without invalidating in the second cache line the second data (and without replacing the second data in the second cache line with new data).

The cache 108 comprises the cache array 112 and a cache control module 116. The cache array 112 is configured to cache data for one or more of the CPUs 104a, . . . , 104c. The cache 108 is a shared cache, i.e., shared among the CPUs 104a, ..., 104c. In an embodiment, the cache 108 is a last level cache (e.g., is coupled to and communicates with the memory 134). In an embodiment, the cache 108 is an N-way cache, where N is a suitable integer. In an embodiment, the cache 108 is a level 2 (L2) cache. In another embodiment, the cache 108 is a level 3 (L3) cache.

The cache control module 116 is configured to control various operations of the cache 108, e.g., caching data in the cache array 112. The cache control module 116 comprises a cleaning module 120. In an embodiment, the cleaning module 120 is configured to clean a cache line while evicting data from another cache line, as will be discussed in more detail herein.

As illustrated in FIG. 1, the memory 134 is external to the integrated circuit 102, in an embodiment. The memory 134 is any appropriate type of memory, e.g., a volatile memory (e.g., an appropriate type of random-access memory), a non-volatile memory (e.g., a read-only memory), or the like. In an embodiment, the memory 134 is a dynamic random-access memory (DRAM), e.g., a double data rate type three (DDR3) synchronous dynamic random access memory (DDR3 SDRAM). As an example, the memory 134 has a native burst length (e.g., a minimum burst size for transferring instructions to the memory 134) of 64 bytes. As an example, the memory 134 is a 64 bit DDR3 SDRAM, and has a native burst length of 64 bytes.

The memory control module 130 controls access to the memory 134. For example, the memory control module 130 controls read operation and write operation associated with the memory 134.

Although not illustrated in FIG. 1 for the sake of simplicity and to avoid obfuscating teaching principles of the present disclosure, the integrated circuit 102 typically includes a number of other components (e.g., a system bus, one or more input/output port, and/or the like). In an embodiment, the integrated circuit 102 includes various other components based on an application area of the integrated circuit 102.

Figure 2:
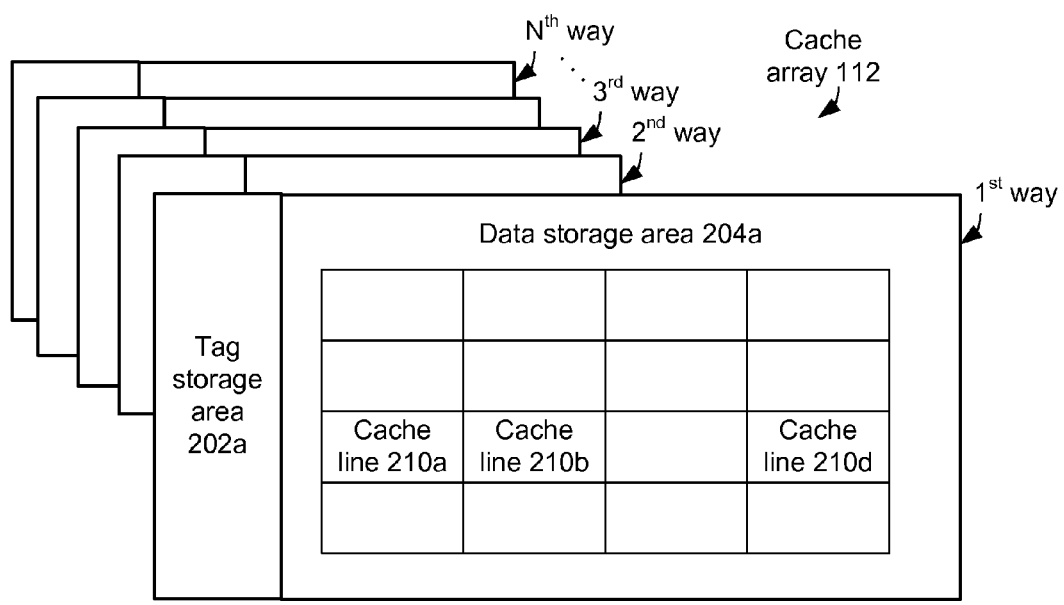
FIG. 2 illustrates an example of a cache array, in accordance with an embodiment.

FIG. 2 illustrates the cache array 112 of FIG. 1 in more detail, in accordance with an embodiment. In an embodiment, the cache array 112 is an N-way cache, where N is a suitable integer. For example, as illustrated in FIG. 2, the cache array 112 comprises a $1^{st}$ way, a $2^{nd}$ way, ..., $N^{th}$ way. Although FIG. 2 illustrates the cache array 112 to be an N-way cache array, such features do not limit the teachings of the present disclosure. For example, in an embodiment and although not illustrated in FIG. 2, the cache array 112 may be a single way cache.

Each way of the N-way cache array 112 comprises a tag storage area and a data storage area. For example, as illustrated in FIG. 2, the $1^{st}$ way of the N-way cache array 112 comprises a tag storage area 202a and a data storage area 204a.

In an embodiment, the data storage area 204a stores data that are cached by the cache array 112 (e.g., by the $1^{st}$ way of the cache array 112). The data storage area 204a comprises a plurality of cache lines, where each cache line is configured to cache data. For example, FIG. 2 illustrates the data storage area 204a of the $1^{st}$ way storing an array of cache lines, in which only example cache lines 210a, 210b and 210d are labeled for purposes of illustrative clarity. The two cache lines 210a and 210b are located adjacent to each other. As illustrated in FIG. 2, the cache line 210d is not adjacent to either of the two cache lines 210a and 210b.

In an example, each cache line of the cache array 112 comprises 32 bytes (i.e., a native burst length of the cache 108 is 32 bytes), although such a number does not limit the teachings of the present disclosure (e.g., each cache line may comprise any other suitable number of bytes).

In an embodiment, if a first cache line has a starting address of Y and if Y is aligned to 64 (i.e., a multiple of 64), then (i) the first cache line and (ii) a second cache line having an address of (Y+32) are complimentary of each other (e.g., assuming that the native burst length of the cache 108 is 32 bytes). In an embodiment, the cache line 210a and the cache line 210b are complementary to each other. For example, assume that a starting address of the cache line 210a is X. If X is aligned to 64 (e.g., if X is a multiple of 64) and the two cache lines 210a and 210b are complimentary to each other, then a starting address of the cache line 210b is (X+32). If X is not aligned to 64 (e.g., if X is not a multiple of 64) and the two cache lines 210a and 210b are complimentary to each other, then a starting address of the cache line 210b is (X−32) (i.e., in such a case, the starting address of the cache line 210b is a multiple of 64). In an embodiment, the cache line 210a and the cache line 210b are complementary to each other, based on the cache line 210a and the cache line 210b being two adjacent cache lines in the cache array 112. In another embodiment, any other appropriate criteria may be used to determine if two cache lines are complimentary to each other.

In an embodiment, the tag storage area 202a stores tag information, where, in an embodiment, the tag information comprises addresses of data currently stored in each cache line of the $1^{st}$ way of the N-way cache array 112 (e.g., addresses of data stored in the data storage area 204a). For example, whether a cache lookup is a hit or a miss is determined based on the tag information.

A dirty cache line of the cache array 112 stores data that has been recently modified, and/or is not currently in synchronization with the memory 134. In an embodiment, the tag storage area 202a also stores information about dirty cache lines of the $1^{st}$ way of the N-way cache array 112. For example, information about dirty cache lines is used to identify if a cache line stores dirty data.

A valid cache line of the cache array 112 stores data that is valid (i.e., data is currently in synchronization with corresponding data in the memory 134). In an embodiment, the tag storage area 202a also stores information about valid cache lines of the $1^{st}$ way of the N-way cache array 112. For example, information about valid cache lines is used to identify if a cache line stores valid data.

In an embodiment, the cache 108 receives requests from one or more of the CPUs 140a, ..., 140c, to perform various cache operations on the cache array 112. For example, the 108 receives requests to read data from the cache array 112, to write data to the cache array 112, and/or the like.

A request, e.g., a read request, may be either a hit or a miss, based on availability of data in the cache 108. For example, if data requested in the read request is presently stored in the cache array 112, the read request is a hit. If the data requested in the read request is not presently stored in the cache array 112, the read request is a miss. In an embodiment, if the read request is a miss, the cache 108 evicts data from a selected cache line, reads the data requested in the read request from the memory 134, and caches the data in the selected cache line (e.g., from which data was evicted earlier). Eviction of data from a cache line may also occur in other situations as well.

Eviction of data from a cache line involves selectively writing the data from the cache line to the memory 134. For example, if data is to be evicted from a cache line that caches clean or valid data (e.g., caches data that is synchronization with the memory 134), eviction of the data from the cache line involves invalidating data currently cached in the evicted cache line by, for example, updating the tag information and/or valid information in the cache array 112. On the other hand, if data is to be evicted from a cache line that includes dirty data (e.g., includes data that is not synchronized with the memory 134), eviction of the data from the cache line involves (i) writing the evicted data from the cache line to the memory 134 (so that the memory 134 stores the most recent version of the data), and (ii) invalidating the evicted data in the cache line by, for example, updating tag information and/or valid information in the cache array 112. Once the evicted data is invalidated in the cache line, new data is possibly written in the cache line (i.e., the evicted data is replaced by new data in the cache line).

In an embodiment, each of the cache lines of the cache 108 (e.g., the cache lines 210a, 210b, 210d) is 32 bytes, whereas a native burst size of the memory 134 is 64 bytes, although such numbers do not limit the teachings of the present disclosure. Thus, in an example, while evicting data from a dirty cache line, 32 bytes of evicted data is to be written to the memory 134. However, as the native burst size of the memory 134 is 64 bytes, writing only the 32 bytes of evicted data to the memory 134 may result in an underutilization in accessing the memory 134. In an embodiment, other suitable lengths of the cache lines and the native burst size of the memory 134 are also possible. For example, in an embodiment, each of the cache lines of the cache 108 is P bytes, whereas a native burst size of the memory 134 is Q bytes, where P and Q are suitable integers and where Q is greater than P (e.g., Q is a multiple of P).

In an embodiment, while evicting data from a first cache line, e.g., by writing the evicted data to the memory 134, a complementary cache line (e.g., which is complimentary to the first cache line) is identified. For example, if the cache line 210b of FIG. 2 is dirty and data from the cache line 210b is to be evicted (e.g., by writing the dirty data from the cache line 210b to the memory 134 and subsequently invalidating the data in the cache line 210b), the cache line 210a is identified to be complimentary to the cache line 210b.

There is a possibility that the complimentary cache line, i.e. cache line 210a in the example, is also dirty. If the cache line 210a is dirty, then the data from the cache line 210a is to be eventually written to the memory 134 some time in future (in other words, if the data in the cache line 210a is selected to be evicted during a future eviction operation). In an embodiment, instead of waiting for writing the data from the cache line 210a possibly during a future eviction operation, the data from the cache line 210a is written to the memory 134 in using the same memory burst carrying the instruction to write the eviction data from the cache line 210b during the eviction of the cache line 210b. For example, during the eviction of the cache line 210b (where the cache line 210b is a dirty cache line), the data in the cache lines 210b and 210a are written to the memory 134. Subsequent to writing the data in the cache lines 210b and 210a to the memory 134, the data in the cache line 210b is invalidated (e.g., by updating the corresponding tag and/or valid information) and replaced with new data that is, for example, read from the memory 134. However, the data in the cache line 210a is not invalidated and/or replaced with new data subsequent to writing the data in the cache lines 210b and 210a to the memory 134. Writing the data in the cache line 210a to the memory 134, while performing the eviction operation of the cache line 210b, ensures that the cache line 210a now becomes valid (e.g., if the cache line 210a was previously dirty). Such writing operation cleans the data stored in the cache line 210a, e.g., by synchronizing the data stored in the cache line 210a with the memory. Accordingly, writing the data in the cache line 210a to the memory 134, while performing the eviction of the data in the cache line 210b, is also referred to herein as a cleaning operation of the cache line 210a. The cleaning operation ensures that the cache line 210a becomes valid, if the cache line 210a was previously dirty. In an embodiment, the cleaning operation is performed by the cleaning module 120.

While performing the eviction operation of the cache line 210b along with the cleaning operation of the cache line 210a, the data in the cache lines 210b and 210a are coalesced or combined, such that the coalesced data has a size of 64 bytes. The 64 bytes coalesced data is transmitted to the memory 134 during, for example, a single burst of the memory 134 (e.g., as the native burst length of the memory 134 also is 64 bytes), for writing to the memory 134 (e.g., so as to more fully use the allocated memory burst size). The coalesced data is transmitted to the memory 134 as a single memory instruction that includes 64 bytes of data.

As the native burst length of the memory 134 also is 64 bytes, the cleaning operation does not adversely affect the performance of the memory 134 (e.g., does not result in a decrease in the speed of the memory 134). Thus, the cleaning operation potentially cleans dirty cache lines, without adversely affecting the performance or speed of the system 10. In other words, the cleaning operation uses unutilized space available in the memory burst to write the data in the cache line 210a to the memory 134.

In an embodiment, coalescing data in the cache lines 210b and 210a, and writing the coalesced data in the memory (e.g., while performing the eviction operation for the data in the cache line 210b) is performed irrespective of whether the data in the cache line 210a is valid or dirty. In an embodiment, coalescing data in the cache lines 210b and 210a, and writing the coalesced data in the memory (e.g., while performing the eviction operation for the data in the cache line 210b) is performed irrespective of whether the data in the cache line 210a needs to be currently evicted. In an embodiment, coalescing data in the cache lines 210b and 210a, and writing the coalesced data in the memory (e.g., while performing the eviction operation for the data in the cache line 210b) is performed to synchronize the data in the cache line 210a with the memory 134 (e.g., to transform potentially dirty data in the cache line 210a to valid data).

In an embodiment, the cleaning operation (i.e., writing the data in the cache line 210a to the memory 134, while evicting the data from the cache line 210b to the memory 134 by writing the data in the cache line 210b to the memory 134) is a low priority operation (as the data in the cache line 210a does not currently need to be evicted or written to the memory 134).

In an embodiment, the cache control module 116 and/or the memory control module 130 can selectively coalesce two cache eviction or write commands. For example, while evicting data from the cache line 210b to the memory 134 (e.g., by writing the data in the cache line 210b to the memory 134), the cache control module 116 and/or the memory control module 130 determines that a previous eviction command for evicting the cache line 210d has not been executed yet (e.g., the previous eviction command for evicting the cache line 210d was buffered in the cache control module 116 and/or the memory control module 130). In such a scenario, instead of performing the cleaning operation of the cache line 210a along with the eviction operation of the cache line 210b, the eviction operation of the cache line 210b is performed along with the eviction operation of the cache line 210d (e.g., as the cleaning operation of the cache line 210a is a relatively low priority operation compared to the eviction operation of the cache line 210d). For example, data from the cache lines 210b and 210d are coalesced and transmitted to the memory 134, during a single burst of the memory 134, for writing to the memory 134. Subsequently, the data in the cache lines 210*b* and 210*d* are evicted, e.g., replaced with new data. Thus, in this example, the cleaning operation of the cache line 210*a* is not performed along with the eviction operation of the cache line 210*b*, as a relatively higher priority operation is performed along with the eviction operation of the cache line 210*b*.

Figure 3:
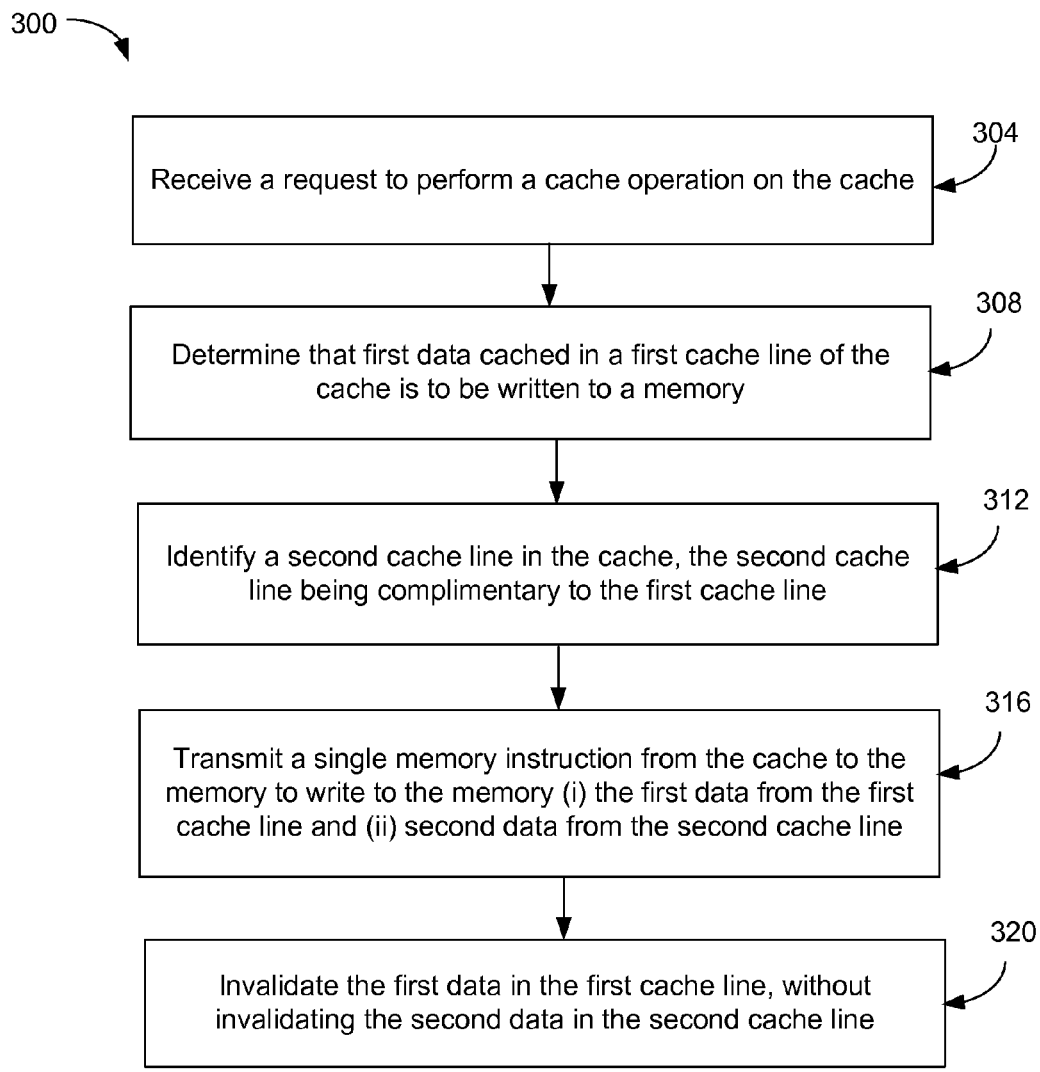
FIG. 3 illustrates an example method for operating the computing system of FIG. 1.

FIG. 3 illustrates an example method 300 for operating the system 10 of FIG. 1. At 304, a cache (e.g., the cache 108) receives a request to perform a cache operation on the cache. The request is received, for example, from one of the CPUs 104*a*, 104*c*. The request is, for example, one of a read request and a write request.

At 308, in response to receiving and processing the request, the cache control module 116 determines that first data cached in a first cache line (e.g., the cache line 210*b*) of the cache 108 is to be written to a memory (e.g., memory 134). For example, the cache control module 116 determines that the request is a miss, and accordingly, selects the cache line 210*b* as a candidate for eviction (e.g., so that new data can be cached in the cache line 210*b*). The cache control module 116 also determines that the first data cached in the cache line 210*b* is dirty data. Accordingly, as a part of evicting the dirty first data from the cache line 210*b*, the cache control module 116 determines that the first data cached in the cache line 210*b* is to be written to the memory 134.

At 312, the cache control module 116 (for example by using the cleaning module 120 in an embodiment) identifies a second cache line (e.g., cache line 210*a*) in the cache 108, the second cache line 210*a* being complimentary to the first cache line 210*b*. In an embodiment, the complimentary second line is either the cache line before (i.e. cache line 210*a*) or a cache line after the cache line 210*b*.

At 316, the cache control module 116 transmits a single memory instruction from the cache 108 to the memory 134 to write to the memory (i) the first data from the first cache line 210*b* and (ii) second data from the second cache line 210*a*, in an embodiment. For example, the cache control module 116 (e.g., the cleaning module 120) coalesces or combines (i) the first data from the first cache line 210 and (ii) the second data from the second cache line 210*a*, and transmits the coalesced data, in the single memory instruction, to the memory 134.

At 320, the cache control module 116 invalidates the first data in the first cache line 210*b*, without invalidating the second data in the second cache line 210*a*. For example, the cache control module 116 updates the corresponding tag information and/or valid information to invalidate the first data in the first cache line 210*b*. In an embodiment, subsequent to invalidating the first data in the first cache line 210*b*, the cache control module 116 replaces the first data in the first cache line 210*b* with new data read from the memory 134, without replacing the second data in the second cache line 210*a* with new data (e.g., irrespective of whether second data in the second cache line 210*a* is dirty or valid).

In accordance with an embodiment, an article of manufacture, such as a system on chip or other integrated circuit, may be provided that includes a storage medium having instructions stored thereon that, if executed, result in the operations described herein with respect to the method 300 of FIG. 3 (and/or various other operations discussed in the present disclosure). In an embodiment, the instructions, if executed, result in the operations being performed by the system 10 of FIG. 1. In an embodiment, the storage medium comprises some type of non-transitory memory (not shown). The storage medium may include volatile and nonvolatile memory, removable and non-removable media implemented in any type or technology for storage of information, such as computer-readable instructions, data structures, program modules, or other data. Such storage medium includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. In accordance with various embodiments, the article of manufacture may be a computer-readable medium such as, for example, software or firmware.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use the terms "embodiment" or "embodiments," which may each refer to one or more of the same or different embodiments. Furthermore, the terms "comprising," "including," "having," and the like, as used with respect to embodiments, are synonymous.

Although certain embodiments have been illustrated and described herein, it is noted that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method comprising:
   receiving, at a cache associated with a central processing unit that is disposed on an integrated circuit, a request to perform a cache operation on the cache;
   in response to receiving and processing the request, determining that first data cached in a first cache line of the cache is to be written to a memory that is coupled to the integrated circuit;
   identifying a second cache line in the cache, the second cache line being complimentary to the first cache line;
   transmitting a single memory instruction from the cache to the memory to write to the memory (i) the first data from the first cache line and (ii) second data from the second cache line; and
   invalidating the first data in the first cache line, without invalidating the second data in the second cache line.

2. The method of claim 1, wherein transmitting the single memory instruction further comprises:
   transmitting the single memory instruction irrespective of whether the second data cached in the second cache line is clean or dirty.

3. The method of claim 1, wherein transmitting the single memory instruction further comprises:
  transmitting the single memory instruction irrespective of whether the second data cached in the second cache line needs to be evicted.

4. The method of claim 1, wherein transmitting the single memory instruction further comprises:
  transmitting the single memory instruction to write to the memory the second data from the second cache line, to transform potentially dirty second data in the second cache line to valid second data.

5. The method of claim 1, further comprising:
  coalescing (i) the first data from the first cache line and (ii) the second data from the second cache line to generate a coalesced data.

6. The method of claim 5, wherein transmitting the single memory instruction from the cache to the memory further comprises:
  transmitting, during a single burst of the memory, the single memory instruction, wherein the single memory instruction comprises the coalesced data.

7. The method of claim 1, wherein:
  a minimum burst size for transferring instructions to the memory is N bytes, where N is an integer;
  the first data cached in the first cache line is less than N bytes;
  the second data cached in the second cache line is less than N bytes; and
  coalesced data, generated by coalescing the first data and the second data, is less than or equal to N bytes.

8. The method of claim 1, wherein identifying the second cache line further comprises:
  identifying the second cache line to be complimentary to the first cache line, based on the first cache line and the second cache line being two adjacent cache lines in the cache.

9. The method of claim 1, wherein the request is one of a read request and a write request.

10. The method of claim 1, wherein the request is a read request, and wherein determining that first data cached in the first cache line is to be written to the memory further comprises:
  determining that the read request is a read miss;
  based on determining that the read request is a read miss, selecting the first cache line for eviction;
  in response to selecting the first cache line for eviction, determining that the first data in the first cache line is dirty data; and
  in response to (i) selecting the first cache line for eviction and (ii) determining that the first data is dirty data, determining that the first data cached in the first cache line is to be written to the memory.

11. A system comprising:
  a memory; and
  an integrated circuit coupled to the memory, the integrated circuit comprising:
    a plurality of central processing units, and
    a cache configured to:
      receive, from one of the plurality of central processing units, a request to perform a cache operation on the cache;
      in response to receiving the request, select a first cache line for eviction, where the first cache line caches first data;
      identify a second cache line in the cache, the second cache line being complimentary to the first cache line;
      transmit a single memory instruction from the cache to the memory to write to the memory (i) the first data from the first cache line and (ii) second data from the second cache line; and
      invalidate the first data in the first cache line, without invalidating the second data in the second cache line.

12. The system of claim 11, wherein the cache comprises:
  a cache array comprising the first cache line and the second cache line;
  a cache controller configured to:
    coalesce (i) the first data from the first cache line and (ii) the second data from the second to generate coalesced data, and
    transmit, during a single burst of the memory, the single memory instruction to the memory, wherein the single memory instruction comprises the coalesced data.

13. The system of claim 11, wherein the single memory instruction is transmitted irrespective of whether the second data cached in the second cache line is clean or dirty.

14. The system of claim 11, wherein the single memory instruction is transmitted to transform potentially dirty second data in the second cache line to valid second data.

15. The system of claim 11, wherein:
  a minimum burst size for transferring instructions to the memory is N bytes, where N is an integer;
  the first data cached in the first cache line is less than N bytes;
  the second data cached in the second cache line is less than N bytes; and
  coalesced data, generated by coalescing the first data and the second data, is less than or equal to N bytes.

16. The system of claim 11, wherein the second cache line is complimentary to the first cache line, based on the first cache line and the second cache line being two adjacent cache lines in the cache.

17. The method of claim 11, wherein the request is one of a read request and a write request.

18. The system of claim 11, wherein the cache is a shared cache, and wherein the cache is shared among the plurality of central processing units.

19. The system of claim 11, wherein the cache is a last level cache.

20. The system of claim 11, wherein the integrated circuit is a system on a chip (SOC).

* * * * *